G. A. LEEKS.
MACHINE FOR GRINDING GLASS DISKS.
APPLICATION FILED NOV. 17, 1917.
1,276,776.
Patented Aug. 27, 1918.
2 SHEETS—SHEET 2.
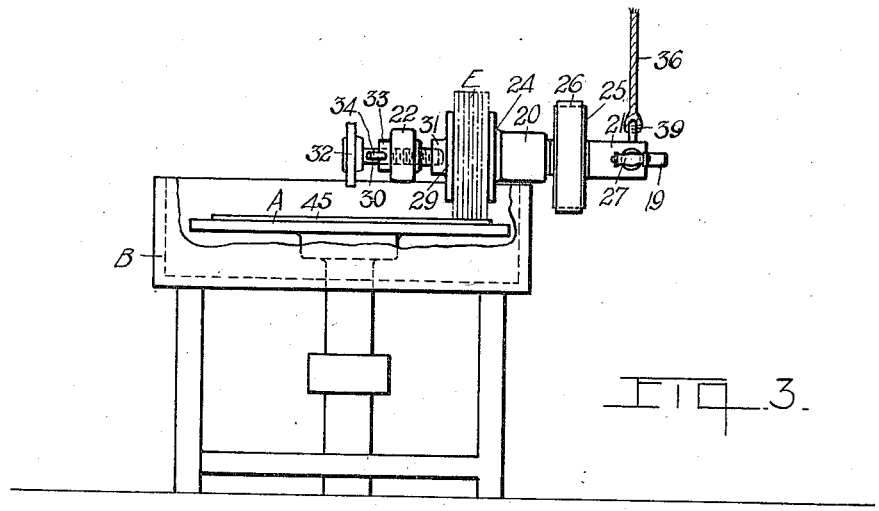
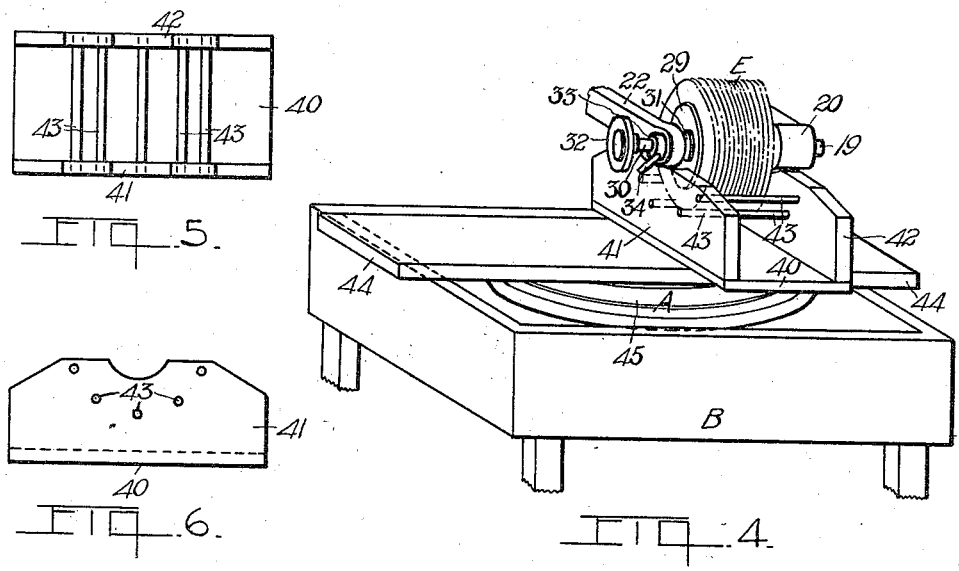
INVENTOR
GEORGE A. LEEKS

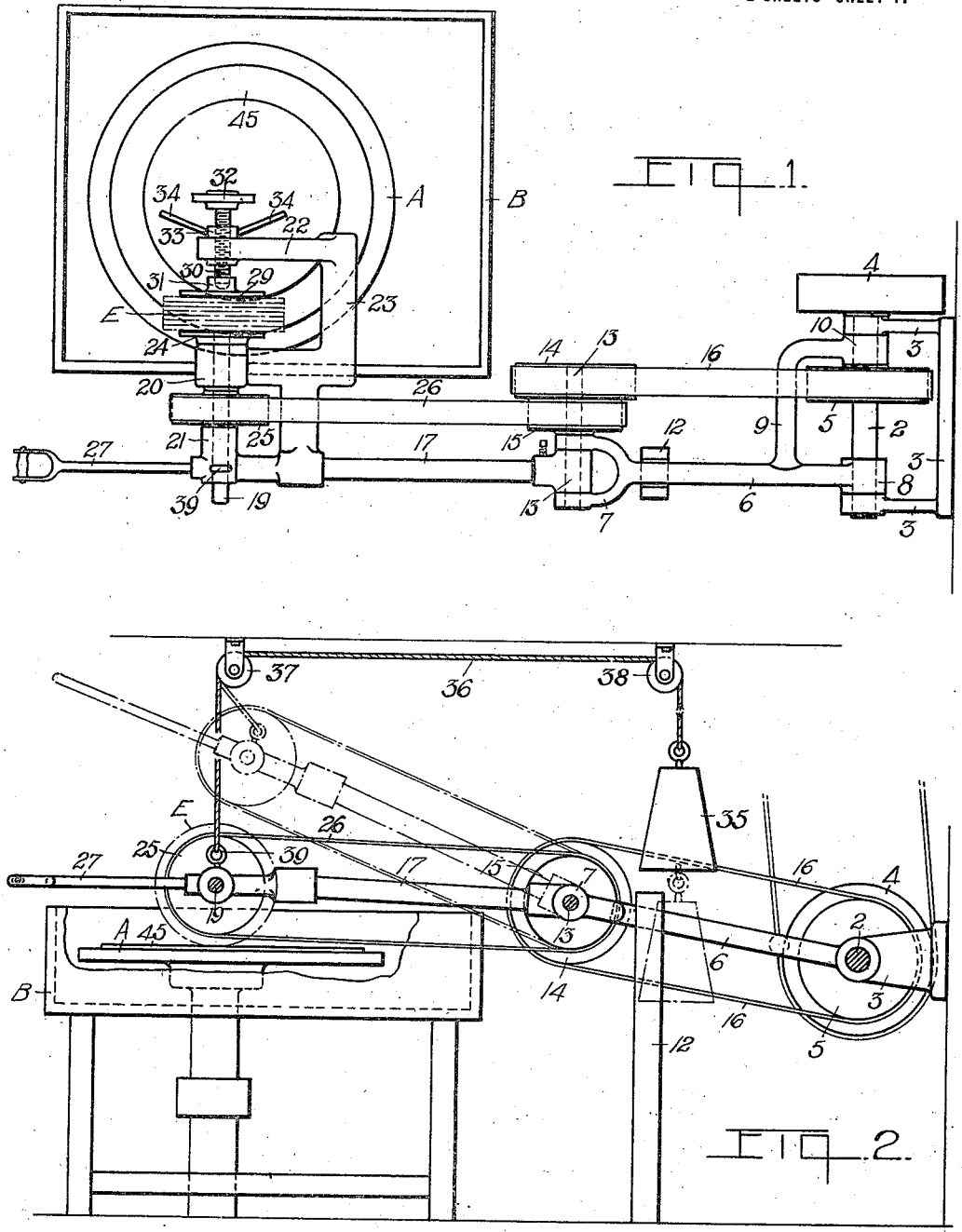

UNITED STATES PATENT OFFICE.

GEORGE A. LEEKS, OF HAMILTON, ONTARIO, CANADA.

MACHINE FOR GRINDING GLASS DISKS.

1,276,776.　　　　　Specification of Letters Patent.　　Patented Aug. 27, 1918.

Application filed November 17, 1917. Serial No. 202,663.

*To all whom it may concern:*

Be it known that I, GEORGE A. LEEKS, a subject of the King of Great Britain, residing at Hamilton, in the county of Wentworth and Province of Ontario, Canada, have invented a new and useful Machine for Grinding Glass Disks, of which the following is a specification.

My invention relates to improvements in a machine for grinding to size the edges at one operation of a multiplicity of glass disks, and more particularly head light lenses, and consists essentially of bearings rigid with a perpendicularly movable arm and carrying disks, for clamping together a plurality of glass disks, rotatable in said bearings, in contact with a revoluble mill, and actuating means therefor.

The invention has for its objects the provision of a machine whereby a multiplicity of glass disks may be circumferentially ground at the same time, thereby greatly facilitating and reducing the cost of manufacture, and labor expended.

A further object is to provide such a machine which will be simple, durable, efficient and precise in its operation, and inexpensive to manufacture.

These, together with other objects may be attained by the construction, combination and arrangement of the parts as will hereinafter be fully described, illustrated in the accompanying drawing, and pointed out in the claims hereunto appended.

With reference to the aforesaid drawing, Figure 1 is a plan view of the entire machine; Fig. 2, a side elevation of the same; Fig. 3, a front elevation thereof; Fig. 4, a perspective detailed view of a portion of the bearing and its component members, showing the rack employed for inserting the glass disks in place between the clamping disks; Fig. 5, a plan of the rack; and, Fig. 6, a side elevation thereof.

Similar reference characters refer to similar parts throughout the several views.

A indicates a horizontal revoluble mill having bearing in a table or bench B which incloses the same on four sides.

A horizontal shaft 2 journaled in a bearing 3 secured to a wall or other suitable support, carries a drive pulley 4 and a tight second pulley 5. An arm 6, having at one end a bifurcated bearing 7, is provided at the opposite end thereof with a bearing 8 loose on the shaft 2, and an integral off set bracket 9 provided with a bearing 10 also loose on the shaft 2, and the arm 6 is intermediately supported and held rigid by an upright 12 adjacent to the bifurcated bearing 7.

A horizontal shaft 13 journaled in the bearing 7 carries tight pulleys 14, 15, the pulley 14 being in longitudinal alinement with the pulley 5, and connected thereto, by a belt 16, and an arm 17 is loose one end on the shaft 13 between the two members of the bearing 7.

A shaft 19 is journaled in integral bearings 20, 21, which are rigidly secured to the forward end of the arm 17, and are movable therewith, and provided with an integral bracket 22 and arm 23. The said shaft has rigid on one end thereof a clamping disk 24, and is provided with a tight pulley 25 between the bearings 20 and 21, which is in alinement with and connected to the pulley 15 by a belt 26. 27 is a handle for actuating the arm 17, and is rigidly secured thereto.

A clamping disk 29 is loose on one end of a rod 30 which threads through the arm 22, the end of said rod being fitted in a corresponding cavity in a collar 31 integral with said disk and provided for the purpose. The opposite end of said rod is provided with a hand wheel 32, and a lock nut 33 provided with actuating handles 34, threads thereon adjacent to the arm 22.

A counter weight 35 is suspended by means of a cable 36 which passes over loose pulleys 37, 38, preferably secured to the ceiling, the opposite end of which cable is secured to an eye bolt 39 rigid with the bearing 21.

The operation of the device is as follows: Assuming that the machine is idle, the arm 17 being vertically swung to a position clear of the mill A, as illustrated in broken lines in Fig. 2 of the drawing, and counter balanced by the weight 35, the glass disks, indicated by E, are placed on their edges in a filling rack constituted by a bottom piece 40, sides 41, 42, and a plurality of transverse rungs 43 arranged in circular form in conformation to the circumference of the glass disks. The said rack is shown detailed in Figs. 5 and 6.

The rack containing the glass disks is then positioned upon a board or rest 44 which has been placed for the purpose upon the table B, and the arm 17 lowered by the handle 27 until the bearing 20 and the arm 22 engage hollowed portions in the sides of said rack concentric with the plurality of rungs 43, then by actuating the threaded rod 30 by means of the hand wheel 32, the glass disks are clamped between the disks 24 and 29, and there retained by tightening the lock nut 33 against the arm 22.

The arm 17 is then raised, releasing the filling rack, and upon removing the board 44 from the table B, is lowered and the glass disks permitted to engage a grinding ring 45 which is rigid with the mill A. These grinding rings are interchangeable, as determined by wear thereon.

The power for spinning the glass disks is transmitted from the shaft 2 which is actuated by the pulley 4, to the shaft 19, by the series of pulleys and belts heretofore described.

Various changes may be made in the construction and arrangement of the parts without departing from the spirit and scope of the invention.

Having now fully described my invention what I claim and desire to secure by Letters Patent of the United States, is:—

1. In a machine of the class described, the combination with a horizontal rotating mill, of a first shaft journaled in a rigid bearing, and actuating means therefor, a second shaft journaled in a bearing, a stationary arm connecting the two bearings, a vertically swingable arm hingedly secured to the second shaft, bearings rigid with the free end of said arm, a third shaft journaled in said bearings, a disk rigid with one end of the third shaft, a hand screw threaded through an arm integral with said bearings, a second disk loose on one end of said screw and disposed opposite to and concentric with the first disk, pulleys rigid with all said shafts, and belts connecting the pulleys, substantially as described.

2. In a machine of the class described, the combination with a horizontal rotating mill, of a vertically swingable arm, bearings rigid with the free end of said arm, a shaft journaled in the bearings, a disk rigid with one end of the shaft, a rod threaded through an arm integral with said bearings, and provided with a hand wheel, a second disk loose on one end of said rod and disposed opposite to and concentric with the first disk, a winged nut threaded on said rod against the arm on the bearings, a cable secured one end to said bearings and passed over pulleys, and a counter weight suspended from the opposite end of the cable, and means for actuating said shaft.

GEORGE A. LEEKS.

Witness:
H. G. HENDRY.